United States Patent
Lee et al.

(10) Patent No.: US 7,486,954 B2
(45) Date of Patent: Feb. 3, 2009

(54) METHOD OF CONTROLLING LOAD SHARING BETWEEN IN-CELL AND SOFT HANDOFF USERS

(75) Inventors: Jung Ah Lee, Pittstown, NJ (US); Shirish Nagaraj, Randolph, NJ (US); Anil M. Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 369 days.

(21) Appl. No.: 11/089,339

(22) Filed: Mar. 25, 2005

(65) Prior Publication Data

US 2006/0215608 A1    Sep. 28, 2006

(51) Int. Cl.
    *H04Q 7/20* (2006.01)
(52) U.S. Cl. .................. 455/442; 455/67.11; 455/226.2
(58) Field of Classification Search ................. 455/436, 455/442, 67.11, 226.2
    See application file for complete search history.

(56) References Cited

U.S. PATENT DOCUMENTS 7,058,035 B2 * 6/2006 English ...................... 370/332
2004/0228349 A1 * 11/2004 Vrzic et al. .............. 370/395.4

* cited by examiner

*Primary Examiner*—Temica M Beamer

(57) ABSTRACT

In the method, rate control for at least one soft handoff user is selectively performed based on a soft handoff loading metric indicative of loading from soft handoff users on the channel.

22 Claims, 3 Drawing Sheets

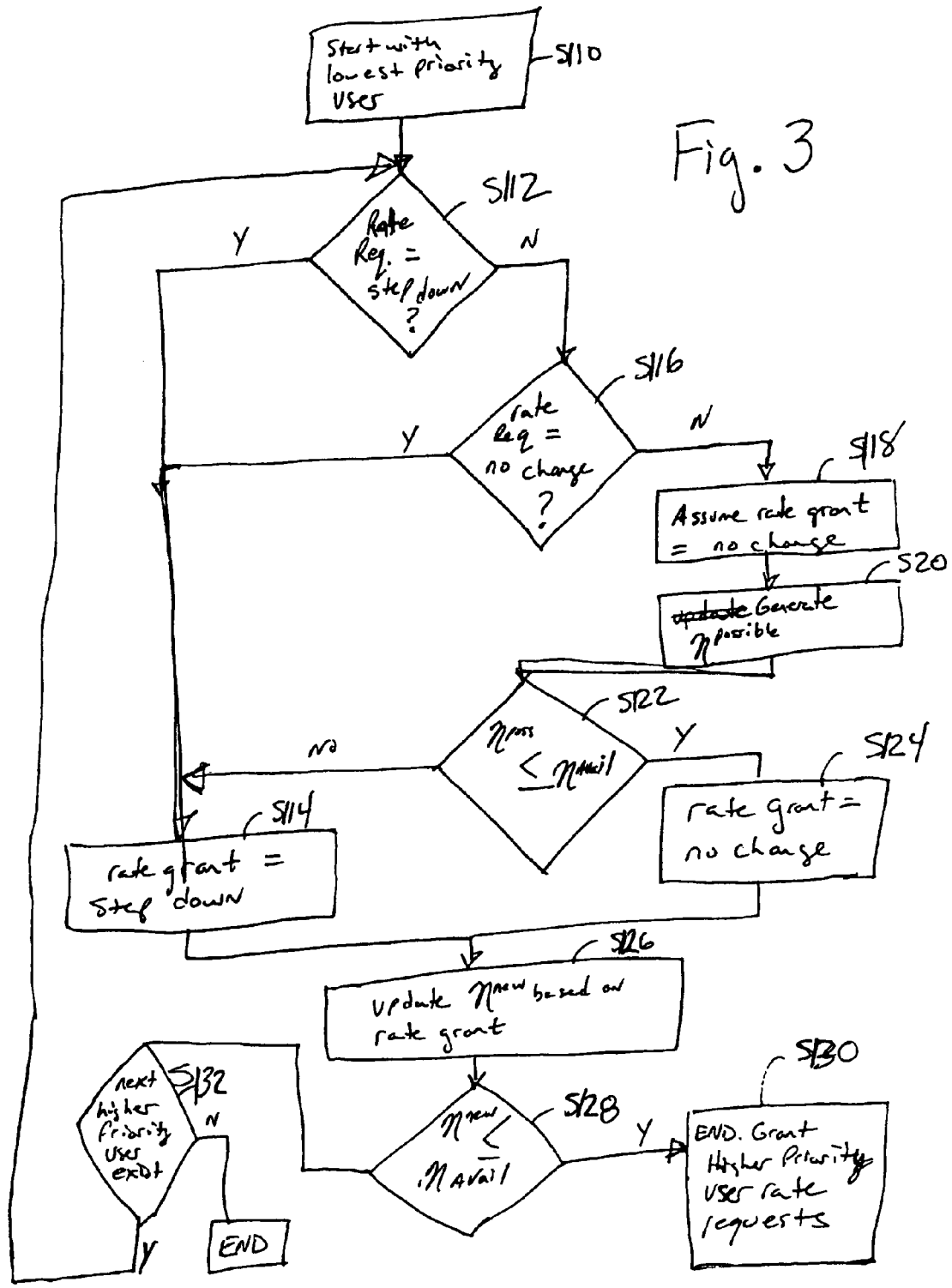

METHOD OF CONTROLLING LOAD SHARING BETWEEN IN-CELL AND SOFT HANDOFF USERS

BACKGROUND OF THE INVENTION

FIG. 1 illustrates a portion of a UMTS wireless communication network. As shown, user equipment (UE) wirelessly communicates with a Node-B serving the communication needs of a geographic area (often referred to as a cell or collection of cells). The UE may be a mobile phone, wireless equipped PDA, wireless equipped laptop, etc. The Node-B is often referred to as a base station in other communication standards. The Node-Bs communicate with a radio network controller (RNC). The RNC routes, for example, data between Node-Bs or on to another communication network such as the internet.

Communication from a Node-B to a UE is referred to as downlink or forward link communication, and communication from a UE to a Node-B is referred to as uplink or reverse link communication. In the uplink, various communication channels may exist.

In the UMTS uplink, an E-DCH (Enhanced Dedicated Channel) is used to provide high-speed scheduled data service. In the E-DCH, a distributed scheduling approach is taken where scheduling decisions are made at each Node-B and communicated to the UEs. A Node-B scheduler allocates the TFI (transport format indication) or TFC (transport format combination) that a UE can use, based on the available rise-over-thermal (RoT) or loading target of a cell. Two types of rate scheduling approaches are supported in UMTS. One is called relative grant mode (RG mode) scheduling and the other is called non-relative grant mode (non-RG mode) scheduling. In relative grant mode scheduling, a UE sends a scheduling information (SI) including power headroom and buffer status. The Node-B scheduler makes scheduling decisions and sends a relative rate grant (RG) message. It is up to the Node-B scheduler to determine an RG for its in-cell users and soft handoff (SHO) users that have radio links with the cell of interest. Currently, there is no mechanism specified in the standard to control sharing of available E-DCH resource between in-cell and SHO E-DCH users.

SUMMARY OF THE INVENTION

Users whose serving cell is the cell of interest are called in-cell users or serving users, and users whose serving cell is other than the cell of interest are called SHO users, non-served soft handoff users, or non-serving users. In an embodiment of the method according to the present invention, load from non-served soft handoff users on a channel is controlled by selectively performing rate control for at least one non-served soft handoff user based on a soft handoff loading metric indicative of loading from non-served soft handoff users on the channel. For example, the channel may be the E-DCH.

For example, the selectively performing step may compare the soft handoff loading metric to a threshold and send a rate reduction instruction to the non-served soft handoff user if the soft handoff loading metric is greater than the threshold. The threshold may be adjusted, for example, by a network operator at a Node B or at an RNC.

In one embodiment, the soft handoff loading metric may be determined as the channel loading from the non-served soft handoff users divided by a sum of the channel loading from the non-served soft handoff users and the served users.

In one embodiment, the served users are prioritized, and granted transmission rates of the prioritized users are controlled in order of lower priority prioritized users to higher priority prioritized users until an estimated use of an uplink resource by the prioritized users falls within an available amount of the uplink resource for the channel. Here, the estimated load is based on determined transmission rates for the prioritized users.

In another embodiment, an estimated use of an uplink resource by prioritized users is determined assuming the transmission rates for the prioritized users are granted. The transmission rates are granted if the estimated use of the uplink resource is less than or equal to an available amount of the uplink resource. Otherwise, rate control for at least one non-served soft handoff user is selectively performed based on a soft handoff loading metric indicative of loading from non-served soft handoff users on the channel if the estimated use of the uplink resource is greater than the available amount of the uplink resource.

Also, if the estimated use of the uplink resource is greater than the available amount of the uplink resource, controlling granted transmission rates of the prioritized users in order of lower priority prioritized users to higher priority prioritized users until an estimated use of an uplink resource by the prioritized users falls within an available amount of the uplink resource for the channel may be performed.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 3 illustrates a flow chart of a method of controlling transmission rates for in-cell users according to an embodiment of the present invention.

DETAILED DESCRIPTION OF THE EMBODIMENTS

An embodiment of a transmission rate control method according to the present invention applied to relative grant mode scheduling will be described. However, the method of the present invention is not limited to relative grant mode scheduling, and from this disclosure it will be apparent that the method may be applied to non-relative grant mode scheduling, etc.

Relative Grant Mode Scheduling

In relative grant mode scheduling, a UE sends scheduling information (SI) including buffer status and available power as an enhanced medium access control (MAC-e) packet data unit (PDU) to a Node-B. The Node-B makes scheduling decisions based on, for example, target loading. While this embodiment will be described using the example of load as the uplink resource for basing scheduling decisions, it will be appreciated that other uplink resources such as rise-over-thermal (RoT) may be used for basing scheduling decisions.

Figure 1:
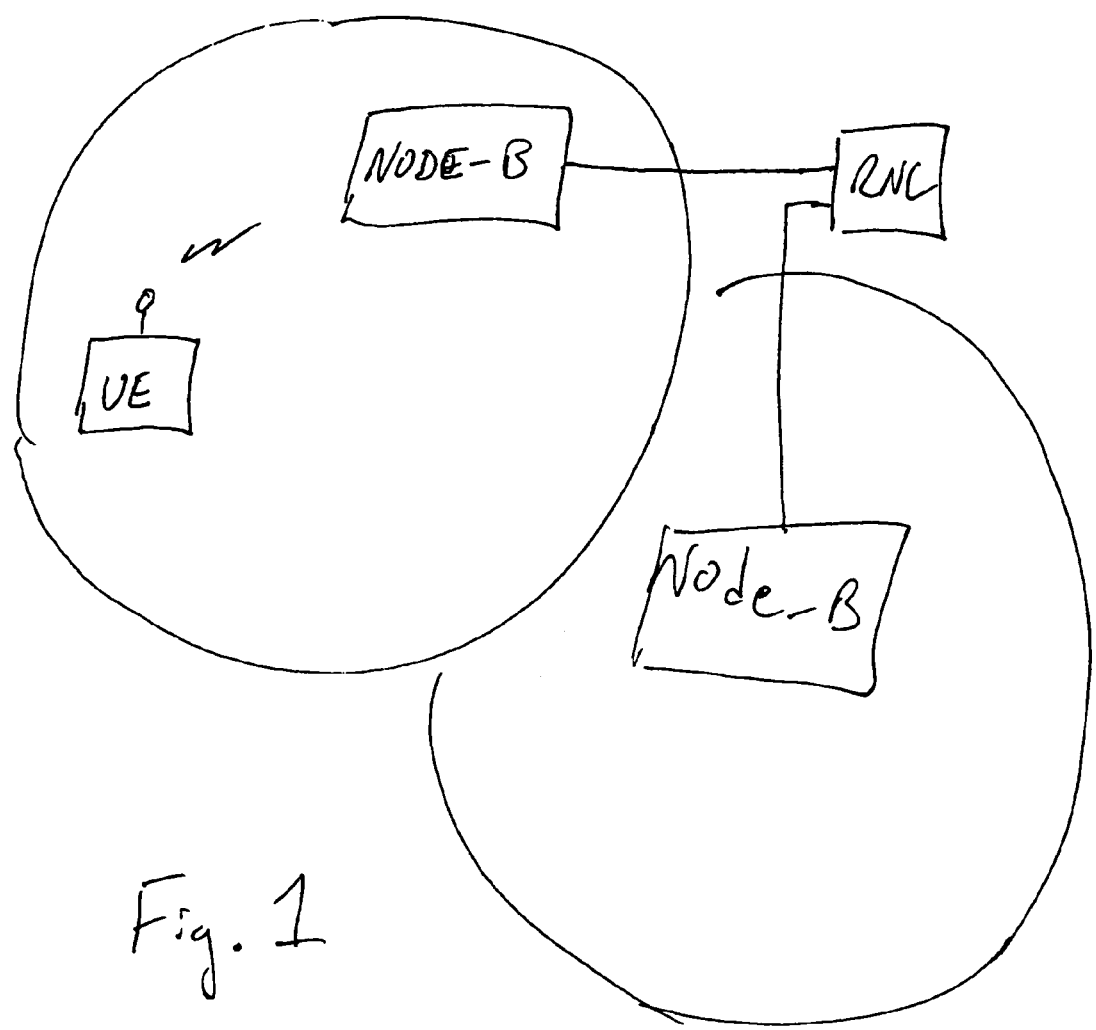
FIG. 1 illustrates a portion of a conventional UMTS wireless communication system.
Figure 2:
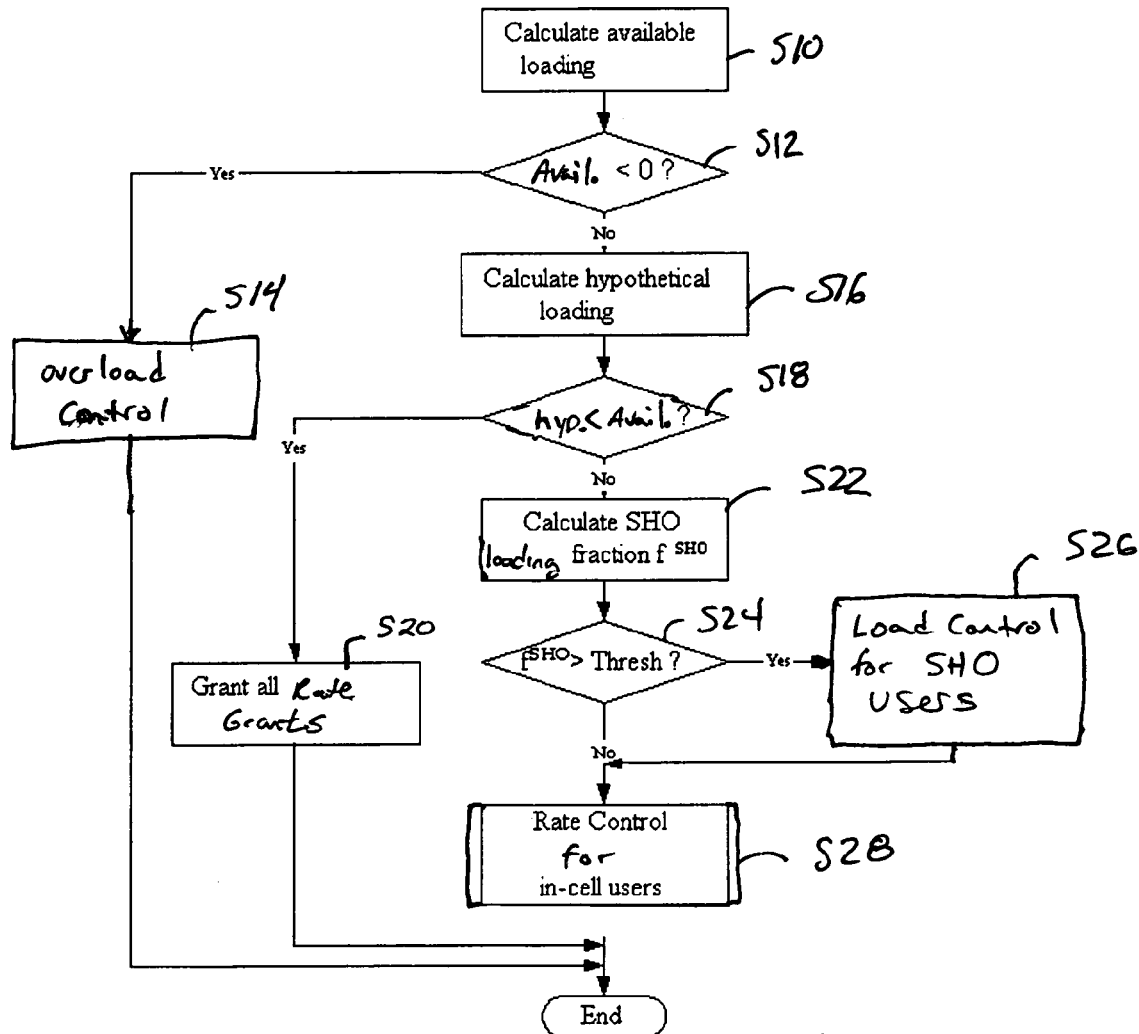
FIG. 2 illustrates a transmission rate control method according to the present invention.

FIG. 2 illustrates a flow chart of a transmission rate control method according to an embodiment of the present invention. As shown, in step S10, the available loading after supporting uncontrollable channels including dedicated channels is determined.

To understand this determination, required rates, priority functions, target loading, and current loading will be described followed by a description of the available loading determination.

Required Rate Calculation:

The required rate for each UE may be determined from a UE's buffer status and power limits. Required rate $R_k^{Req}$ for each UE k may be determined from:

$$R_{jk}^{Req} = \min[R_k^{max, power}, \arg\max\{R|Q \geq R \times T_{SP}\}] \quad (1)$$

where $R_k^{max, power}$ is the maximum TFI that is allowed based on a UE power limit, Q is buffer depth, and $T_{SP}$ is the scheduling period. Then, the Node-B scheduler determines a required relative grant having one of 3 states [STEP_UP, STEP_DOWN, NO_CHANGE], indicating increase, decrease, or no change relative to the current traffic-to-pilot power ratio (TPR) for the UE. More specifically, if the Node B determines a required rate that is greater than the previous transmission rate for the UE, the required rate is characterized as a step up state; if the Node-B determines the required rate is the same as the previous transmission rate for the UE, the required rate is characterized as a no change state; and if the Node-B determines the required rate is less than the previous transmission rate for the UE, the required rate is characterized as a step down state.

Priority Function:

At the Node-B, served UEs are ordered according to a priority function, starting from the highest priority user. In a proportional fairness scheduler, the priority function may be computed according to the following expression:

$$P_{jk}(n) = \frac{R_{jk}^{Req}(n)}{\overline{R}_{jk}(n)} \quad (2)$$

where $\overline{R}_{jk}(n)$ is the average allocated rate of user k. The average allocated rate is computed as:

$$\overline{R}_{jk}(n) = \left(1 - \frac{1}{T_c}\right)\overline{R}_{jk}(n-1) + \left(\frac{1}{T_c}\right)R_{jk} \quad (3)$$

where $T_c$ is a time constant.

Target Loading:

The maximum loading allowed in a cell may be set such that the rise-over-thermal (RoT) overshoot probability is limited to a certain value. Any well-known overshoot control algorithm may be used to determine a target RoT. The maximum loading may be calculated from RoT target using the relation:

$$\eta^{Max} = 1 - \frac{1}{RoT_{Target}} \quad (4)$$

Current Loading:

The current uplink loading may be calculated every scheduling period from the well-known received total wideband power (RTWP) measured at the radio according to the following expression:

$$\eta = 1 - \frac{P_{th}}{RTWP} \quad (5)$$

where the RTWP is computed every scheduling period as the slot-rate RTWP averaged over a period of the scheduling interval, and $P_{th}$ is the well-known, measurable quantity, background noise power including thermal noise power and non-CDMA interference to the CDMA carrier.

Available Loading:

For a user k using rate $R_k$, the user's contribution to the loading of cell j may be computed as:

$$\eta_{jk}(R_k) = (E_c/I_o)_{jk}[1 + (\beta_e/\beta_c)^2 \times N_{multicode}] \quad (7)$$

where Ec/Io is the received energy per chip to total received power, $(\beta_e/\beta_c)_2$ is the traffic-to-pilot power ratio for E-DCH, and $N_{multicode}$ is the number of multicodes used.

The available loading is calculated by calculating the loading due to other cell interference and dedicated channels (DCH), which are well-known channels set forth in UMTS. For example, DCH channels are used to carry uplink voice communication or low-latency constant rate data traffic. The loading from DCH users and other-cell interference $I_{OC}$ may be computed by:

$$\eta_j^{IDCH+1} = \eta - \sum_{k, serving} \eta_{jk}(R_k). \quad (8)$$

The summation is over all the users that have cell j as their serving cell. Available loading for new E-DCH transmission may then be calculated as:

$$\eta_j^{available} = \eta^{Max} - \eta_j^{IDCH+1} - \sum_{k, Retx} \eta_{jk}(R_k) \quad (9)$$

The last summation is for all on-going HARQ retransmissions of E-DCH users.

Overload Control

Returning to FIG. 2, next in step S12 the scheduler at the Node B determines if $\eta_j^{available} < 0$. If $\eta_j^{available} < 0$, the scheduler cannot allocate resource to any new E-DCH transmission. As a result, the scheduler performs overload control in step S14. For example, in one embodiment, the scheduler steps down all users (UEs) rates as follows:

$$RG_{jk}(n) = \begin{cases} \text{'STEP\_DOWN'} & \text{if } R_{jk}(n-1) > R^{min} \\ \text{'NO\_CHANGE'} & \text{otherwise} \end{cases} \quad (10)$$

Here, RG stands for relative rate grant, and $R^{min}$ is the minimum data rate configured for a user. Processing according to the method then ends.

Rate Control

In step S12, however, if $\eta_j^{available} \geq 0$, then in step S16, the scheduler calculates the hypothetical or estimated loading, if required rate grants for all serving users are granted, according to the following:

$$n_j^{hyp} = \sum_k \eta_{jk}(R_k^{Req}) \qquad (11)$$

In step S18, the scheduler determines if $\eta_j^{hyp} \leq n_j^{available}$. If $\eta_j^{hyp} \leq n_j^{available}$, then in step S20, the scheduler grants all users' required rate grants. However, in step S18, if $\eta_j^{hyp} > n_j^{available}$, then in step S22 the scheduler calculates a soft handoff (SHO) loading fraction, which indicates the impact on E-DCH loading caused by UEs in SHO that are not served by this Node B. As is known, when a UE enters into soft handoff, a portion of the resources of non-serving Node Bs that, generally, neighbor the serving Node B are utilized during the soft handoff process. Accordingly, such SHO UEs contribute the E-DCH loading at non-serving Node Bs. The SHO loading fraction is defined as the ratio of non-serving E-DCH loading relative to the total E-DCH loading:

$$f^{SHO} = \frac{L_{Non\text{-}serving}^{E\text{-}DCH}}{L_{Total}^{E\text{-}DCH}} \qquad (12)$$

where $L_{Total}^{E\text{-}DCH} = L_{Serving}^{E\text{-}DCH} + L_{Non\text{-}serving}^{E\text{-}DCH}$, $L_{Serving}^{E\text{-}DCH}$ is the load on E-DCH from served E-DCH users or UEs, and $L_{Non\text{-}serving}^{E\text{-}DCH}$ is the load on E-DCH of the non-served users or UEs.

The non-serving and serving E-DCH loading can be obtained EDPCCH from DPCCH pilot SIR $$\frac{E_{c,k}^{DPCCH}}{I_0},$$

traffic-to-pilot power ratio (TPR) and E-DPCCH SIR for each user k that has radio links with the cell of interest.

$$L_{Serving}^{E\text{-}DCH} = \sum_{k, Serving} \left( \frac{E_{c,k}^{DPCCH}}{I_0} \times TPR_k^{E\text{-}DCH} + \frac{E_{c,k}^{E\text{-}DPCCH}}{I_0} \right) \qquad (13)$$

$$L_{Non\text{-}Serving}^{E\text{-}DCH} = \sum_{k, Non\text{-}serving} \left( \frac{E_{c,k}^{DPCCH}}{I_0} \times TPR_k^{E\text{-}DCH} + \frac{E_{c,k}^{E\text{-}DPCCH}}{I_0} \right) \qquad (14)$$

Then, in step S24, the scheduler determines if the SHO loading fraction is greater than a threshold amount. If so, then in step S26, the scheduler performs load control for SHO users. Namely, a RG=DOWN is sent to a few, groups of, or all non-serving users to indicate a SHO overload condition. Upon reception of RG=DOWN, a UE decrements its serving grant by a pre-defined step size.

As will be appreciated from the forgoing description, this embodiment of the present invention provides a SHO load control metric defined as a portion of non-serving E-DCH loading relative to total E-DCH loading. Furthermore, by use of the threshold, SHO users have access to the uplink resource even when the cell may be heavily loaded. The threshold may be set based on empirical design study, for example, may be set to 0.2 or 0.3. The threshold may be directly set at the Node B, or may be configured by communication from the RNC.

Additionally, or alternatively, network operators may actively control/change the threshold to throttle the limits on allowed uplink resource for SHO users. This may be accomplished by direct entry at the Node B, or by entry at the RNC and communication to the Node B(s). By reducing the threshold, the available uplink resource may be increased, and thus, the cell throughput may be increased.

After step S26, or if in step S24 the SHO loading fraction is not greater than the threshold amount, then in step S28 the scheduler begins selectively reducing the rates of the users starting from the lowest priority user. After each rate reduction, the scheduler updates the estimated load in light of the rate reduction. When the estimated load becomes less than or equal to the available load, the scheduler discontinues the rate reduction process and grants the required rate grants of the remaining higher priority users. This rate reduction process will now be described in detail with reference to the flow chart illustrated in FIG. 3.

As shown, in step S110, processing starts with the lowest priority user. Then, in step S112, the scheduler determines if the required rate grant for this user is a step down state. If so, the required rate grant is assigned in step S114, and processing proceeds to step S126.

If, in step S112, the scheduler determines that the required rate grant is not a step down, then in step S116, the scheduler determines if the required rate grant is no change. If so, then processing proceeds to step S114 where the scheduler assigns a rate grant of step down. Namely, if the UE required rate is the same rate as the previous transmission, the scheduler decreases the transmission rate. Processing then proceeds to step S126.

If, in step S116, the scheduler determines that the required rate grant is not a no change state, then the required rate grant is a step up state. In step S118, the scheduler treats the required rate grant as a no change state, and in step S120 determines a new possible estimated load assuming the required rate grant is a no change state. Subsequently, in step S122, the scheduler determines if the new possible estimated load is less than or equal to the available load. If so, then the scheduler assigns a rate grant of no change. Namely, if the UE requires to transmit at higher rate than the previous transmission, the scheduler assigns the same transmission rate as the previous transmission. Processing then proceeds to step S126. However, if in step S122, the scheduler determines that the new possible estimated load is greater than the available load, then processing proceeds to step S114 where the scheduler assigns a rate grant of step down. Processing then proceeds to step S126.

In step S126, the scheduler updates the estimated load based on the rate granted to the UE under consideration. The scheduler then determines if the updated, estimated load is less than or equal to the available load in step S128. If so, then the scheduler grants the required rate grants of all high priority users and processing ends. However, if the estimated load is still greater than the available load in step S128, then in step S132, the scheduler determines if a next higher priority user exists or not. If not, then processing ends. If a next higher priority user exists, then processing returns to step S112 for the next higher priority user.

The invention being thus described, it will be obvious that the same may be varied in many ways. For example, while the embodiments described above concerned the E-DCH in a UMTS wireless communication system, the present invention is not limited in application to this channel or a UMTS system. Such variations are not to be regarded as a departure from the invention, and all such modifications are intended to be included within the scope of the invention.

We claim:

1. A method of controlling load from non-served soft handoff users on a channel, comprising:
   selectively performing rate control for at least one non-served soft handoff user based on a soft handoff loading metric indicative of loading from non-served soft handoff users on the channel; and
   determining the soft handoff loading metric based on loading from the non-served soft handoff users on the channel in relation to at least loading from served users on the channel.

2. The method of claim 1, wherein the determining step determines the loading from non-served soft handoff users on the channel in relation to at least loading from the served users on the channel and non-served-soft handoff users on the channel.

3. The method of claim 2, wherein the channel is an enhanced dedicated channel.

4. The method of claim 2, wherein the determining step determines the soft handoff loading metric as the loading from the non-served soft handoff users divided by a sum of the loading from the non-served soft handoff users and the served users.

5. The method of claim 4, wherein the selectively performing step compares the soft handoff loading metric to a threshold and selectively performs rate control based on results of the comparison.

6. The method of claim 5, wherein the selectively performing step sends a rate reduction instruction to the non-served soft handoff user if the soft handoff loading metric is greater than the threshold.

7. The method of claim 6, wherein the selectively performing step sends a rate reduction instruction to each of the non-served soft handoff users if the soft handoff loading metric is greater than the threshold.

8. The method of claim 6, wherein the served users are prioritized, and further comprising:
   controlling granted transmission rates of the prioritized users in order of lower priority prioritized users to higher priority prioritized users until an estimated use of an uplink resource by the prioritized users falls within an available amount of the uplink resource for the channel, the estimated load being based on determined transmission rates for the prioritized users.

9. The method of claim 6, further comprising:
   adjusting the threshold.

10. The method of claim 1, further comprising:
    determining the soft handoff loading metric as a loading from non-served soft handoff users on the channel divided by a total loading on the channel.

11. The method of claim 1, wherein the selectively performing step compares the soft handoff loading metric to a threshold and selectively performs rate control based on results of the comparison.

12. The method of claim 11, wherein the selectively performing step sends a rate reduction instruction to the non-served soft handoff user if the soft handoff loading metric is greater than the threshold.

13. The method of claim 12, further comprising:
    adjusting the threshold.

14. The method of claim 12, wherein the selectively performing step sends a rate reduction instruction to each of the non-served soft handoff users if the soft handoff loading metric is greater than the threshold.

15. The method of claim 12, wherein the served users are prioritized, and further comprising:
    controlling granted transmission rates of the prioritized users in order of lower priority prioritized users to higher priority prioritized users until an estimated use of an uplink resource by the prioritized users falls within an available amount of the uplink resource for the channel, the estimated load being based on determined transmission rates for the prioritized users.

16. A method of controlling load from non-served soft handoff users on a channel, comprising:
    determining an estimated use of an uplink resource by prioritized users if transmission rates for the prioritized users are granted;
    granting the transmission rates if the estimated use of the uplink resource is less than or equal to an available amount of the uplink resource;
    selectively performing rate control for at least one non-served soft handoff user based on a soft handoff loading metric indicative of loading from non-served soft handoff users on the channel if the estimated use of the uplink resource is greater than the available amount of the uplink resource; and
    determining the soft handoff loading metric based on loading from the non-served soft handoff users in relation to at least loading from the prioritized users.

17. The method of claim 16, wherein the selectively performing step compares the soft handoff loading metric to a threshold and selectively performs rate control based on results of the comparison.

18. The method of claim 17, wherein the selectively performing step sends a rate reduction instruction to the non-served soft handoff user if the soft handoff loading metric is greater than the threshold.

19. The method of claim 18, further comprising:
    adjusting the threshold.

20. The method of claim 18, wherein the selectively performing step sends a rate reduction instruction to each of the non-served soft handoff users if the soft handoff loading metric is greater than the threshold.

21. The method of claim 18, wherein if the estimated use of the uplink resource is greater than the available amount of the uplink resource, further comprising:
    controlling granted transmission rates of the prioritized users in order of lower priority prioritized users to higher priority prioritized users until an estimated use of an uplink resource by the prioritized users falls within an available amount of the uplink resource for the channel, the estimated load being based on determined transmission rates for the prioritized users.

22. The method of claim 16, wherein the determining determines the the soft handoff loading metric as the loading from the non-served soft handoff users divided by a sum of the loading from the non-served soft handoff users and loading from the prioritized users.

* * * * *